Oct. 11, 1960 J. F. MATHIS 2,956,007
ACTIVATION OF PLATINUM REFORMING CATALYST
Original Filed Oct. 10, 1955

INVENTOR.
James F. Mathis,
BY
ATTORNEY

United States Patent Office 2,956,007
Patented Oct. 11, 1960

---

2,956,007
ACTIVATION OF PLATINUM REFORMING CATALYST

James F. Mathis, Baytown, Tex., assignor, by mesne assignments, to Esso Research and Engineering Company, Elizabeth, N.J., a corporation of Delaware Original application Oct. 10, 1955, Ser. No. 539,329. Divided and this application Nov. 26, 1958, Ser. No. 776,538

12 Claims. (Cl. 208—140)

The present invention is directed to a method for reactivating reforming catalyst. More particularly, the invention is directed to reactivating a platinum reforming catalyst. In its more specific aspects, the invention is concerned with the reactivation and use of a platinum reforming catalyst supported on alumina. This application is a division of U.S. Serial No. 539,329, filed October 10, 1955, for James F. Mathis and now abandoned.

The present invention may be briefly described as a method for reactivating a platinum reforming catalyst in which a solid inorganic metal halide is treated at an elevated temperature under conditions to form and release volatile halogen which is then employed to contact a platinum reforming catalyst supported on alumina in a reforming zone whereby the platinum reforming catalyst is reactivated.

In the present invention the solid inorganic metal halide may be selected from a large number of solid inorganic metal halides from which halogens such as chlorine or hydrogen chloride may be formed among which may be mentioned aluminum chloride, $PtCl_2$, ferric chloride, ferrous chloride, copper chloride ($CuCl_2$), silver chloride, gold chloride, chromium chloride, nickel chloride, and the like. Other solid inorganic halides may be used, such as the fluorides, but the chlorides are to be preferred.

The volatile halogens may be formed and released in situ by treating a suitable inorganic metal halide, such as aluminum chloride with a hydrolyzing agent or, for example, platinum chloride may be heated to a decomposition temperature no less than 680° F. to release chlorine. Likewise, the suitable chlorides of copper, silver, gold, iron and the like may be treated with a reducing agent such as hydrogen to reduce the chlorides to the metals and thereby form hydrogen chloride.

The solid inorganic metal halides may suitably be placed as a separate bed either in a reaction zone containing a bed of platinum catalyst supported on alumina or in a separate vessel; or the halide may be intermixed with or intermingled in the bed of platinum catalyst on alumina. A separate vessel containing the halide is to be preferred. When sublimable chlorides, such as aluminum chloride and ferric chloride, are employed a separate bed of solid inorganic halide may be used and a hot carrier gas which may be a hydrocarbon or a flue gas and the like may be flowed through the bed of solid inorganic halide at a suitable temperature to cause sublimation of the inorganic metal halide and carry same for deposit in and/or on the platinum reforming catalyst supported on alumina. Thereafter, or concurrently, the sublimed inorganic metal halide may be treated with a hydrolyzing medium such as a gas or vaporous medium containing small amounts of water or suitably treated with steam to cause hydrolysis of the sublimed inorganic metal halide and to form and release in the reforming zone volatile halogen in contact with the platinum reforming catalyst.

In short, the platinum reforming catalyst may be suitably reactivated by releasing and forming in situ in the reforming zone volatile halogen which is formed by hydrolysis, decomposition, and/or reaction of a suitable inorganic metal halide.

In the practice of the present invention the reactivated catalyst is then suitably employed in reforming operations, for example, to convert naphthenes to aromatics.

The hydrocarbon employed as the feed stock of my invention is a naphthenic hydrocarbon boiling in the range from about 150° to about 500° F. Such naphthenic hydrocarbons may be obtained from crude petroleums, such as the Coastal crude oils, the California type crudes and particularly those from naphthenic base crude petroleum. I may also employ as a feed stock, either alone or in admixture with the crude petroleum fractions, the naphthenic fractions boiling in the range from 150° to 500° F. obtained in catalytic conversion operations, such as catalytic cracking operations. It is preferred, however, to employ the crude petroleum fractions.

In the reforming or conversion operation temperatures may suitably range from about 800° to about 1000° F. with desirable results being obtained at about 950° F.

After a period of time the catalyst may become fouled with carbonaceous and other deposits and it may be desirable to burn these materials from the catalyst. These combustion operations are suitably termed regeneration operations and may be conducted at a temperature from 1050° to 1100° F. in a combustion operation in which non-volatile carbonaceous deposits and carbon are removed from the catalyst by burning in the presence of free oxygen.

The pressures employed in the conversion operation preferably range from 200 to 400 pounds per square inch gauge but pressures as low as 15 pounds per square inch gauge and as high as 700 pounds per square inch gauge may be used.

The amount of hydrogen employed may range from about 1000 cubic feet to about 10,000 cubic feet per barrel of hydrocarbon feed. The preferred operation will employ about 5000 cubic feet of hydrogen per barrel of feed. While pure hydrogen may be used, ordinarily, it is preferred to employ a free hydrogen-containing gas, such as a make gas, in the operation.

The temperature at which the catalyst is reactivated may range from 680° up to about 1000° F. When a sublimable or volatile solid inorganic metal halide is used, sublimation temperatures will be employed depending on the compound used. For example, when aluminum chloride is used a sublimation temperature of about 352° F. may be employed, whereas with ferric chloride a sublimation temperature of about 599° F. is suitable. Thereafter, the sublimed inorganic metal halide is suitably treated to reactivate the catalyst, for example, at a temperature no less than about 680° F.

In practicing the present invention, it may be necessary and sometimes preferred to subject the catalyst to a regeneration operation which is used in the sense of a combustion operation to burn off non-volatile carbonaceous deposits. Reactivation treatment as opposed to regeneration treatment is concerned with the provision of free halogen in contact with the catalyst under suitable conditions whereby the catalyst has its activity for catalyzing the reforming operation restored.

The present invention may be further illustrated by reference to the drawing in which.

Figure 1:
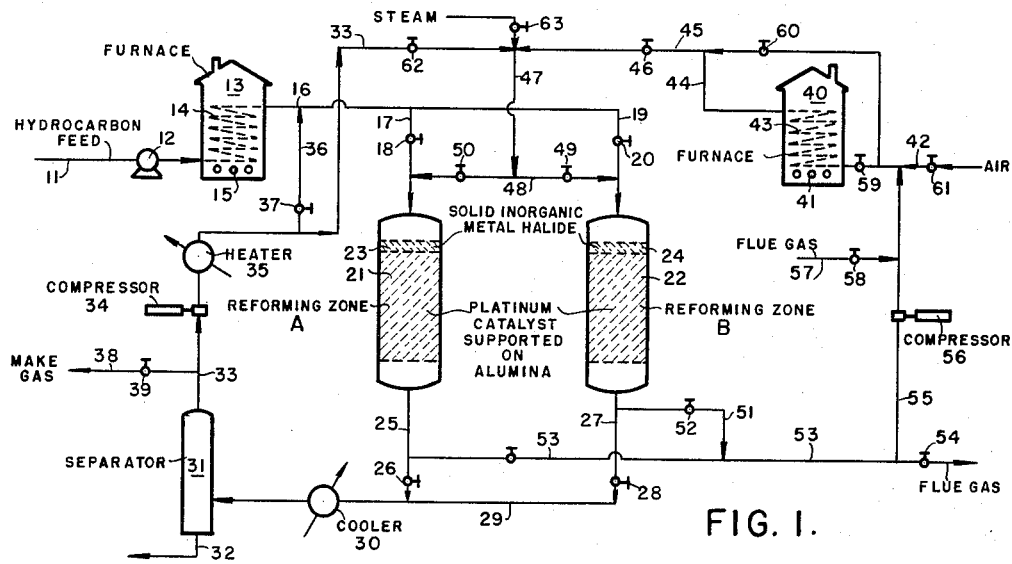
Fig. 1 is a flow diagram of one mode of practising the invention.

Referring now to the drawing and particularly to Fig. 1, numeral 11 designates a feed line through which a hydrocarbon feed of the type mentioned is introduced into the system from a source not shown. The feed in line 11 is pumped by way of pump 12 into a heater or furnace 13 provided with a heating coil 14 supplied with heat through gas burners 15.

The hydrocarbon is heated and vaporized in furnace 13 and discharged therefrom by line 16 for introduction by way of either line 17 controlled by valve 18 or line 19 controlled by valve 20 into either reaction zone A or B, each provided with a bed of platinum catalyst supported on alumina indicated generally by numerals 21 and 22.

Arranged in the path of flow into the reforming zones 21 and 22 are beds of solid inorganic metal halide generally designated by numerals 23 and 24.

Products from the reforming zones 21 and 22 issue therefrom by way of line 25, controlled by valve 26, and line 27 controlled by valve 28, both of which connect into line 29 containing a cooler 30 for routing of the reformed product into a separator 31 wherein a separation is made between the gas produced in the operation and the liquid product, the liquid product being discharged from the system by line 32 for further treatment, such as fractional distillation, solvent extraction, and the like, for separation of the aromatics formed from the naphthenes and recovery thereof.

The gases produced in the operation are rich in hydrogen and are separated in separator 31 and withdrawn therefrom by line 33. These gases are compressed in compressor 34 and are then heated to a reaction temperature in heater or furnace 35 and discharged by way of branch line 36 controlled by valve 37 into line 16 to provide the hydrogen-containing gas for the reaction.

Since hydrogen is produced in the operation it may be necessary to discharge a portion of the make gas through line 38 controlled by valve 39. At the beginning of the operation, however, hydrogen may be supplied extraneously to line 38 by connecting same to a source of hydrogen. Ordinarily, hydrogen will be discarded after the operation has been initiated.

After the platinum catalyst in either of the zones becomes fouled with non-volatile carbonaceous deposits, it may be desirable to remove same by combustion operations and to this end means are provided for regenerating the catalyst. Ordinarily the feed stock will be charged to one of the reaction zones while the other of the reaction zones may be undergoing a regeneration reaction and for purposes of description it will be assumed that the feed stock is being introduced into zone A while zone B is undergoing regeneration. To this end, the catalyst bed 22 in reforming zone B may be regenerated by injecting flue gas containing air into a furnace 40 provided with burners 41 which serves to raise the temperature of the air plus flue gas introduced by line 42 into the heating coil 43. The flue gas then passes by way of line 44 into line 45 controlled by valve 46 and thence into line 47 and by way of manifold 48 provided with valves 49 and 50 into line 19 and thence to pass through the bed 22 in zone B. A combustion operation takes place in zone B causing the burning off of the carbonaceous deposits and flue gases are removed therefrom by line 51 controlled by valve 52, valve 28 being closed allowing the flue gas to discharge into line 53 and to be discharged from the system by opening valve 54 or recycled to line 42 by line 55 containing a compressor 56. At the introduction of the operation flue gas may be supplied to line 55 by branch line 57 controlled by valve 58.

It may be desirable to adjust the temperature of the flue gas in line 46 and all or part of the flue gas in line 42 may be bypassed around furnace 40 by closing or controlling valve 59 and opening valve 60 in line 45. Air is introduced into the flue gas by opening valve 61 in line 42.

After the catalyst in bed 22 has been regenerated by burning off the non-volatile carbonaceous deposits, it may be desirable to reactivate the catalyst bed 22. This may be accomplished by any one of several ways but it may be assumed that the solid inorganic metal halide is, for example, a reducible metal halide, such as copper, gold, or silver chloride or nickel chloride or the like. A portion of the hydrogen-containing gas in line 33 would be discharged by line 33 on opening valve 62 into line 47 and by virtue of opening valve 49 would allow hydrogen to be introduced into zone B to pass through bed 24 and to reduce the bed of solid inorganic metal halide and cause hydrogen chloride to pass into the bed 22 in contact with the platinum catalyst supported on alumina. The presence of halogen causes the reactivation of the bed of platinum catalyst.

If the bed of solid inorganic metal halide 24 is a sublimable metal halide, then flue gas by line 45 may be introduced into line 47, valve 62 being closed to cause the inorganic metal halide in the bed 24 to be sublimed and carried into the bed 22. The flue gas may have a small amount of moisture introduced or contained therein to cause a hydrolysis reaction to take place in the bed 22 to hydrolyze the aluminum chloride, for example, to form and release hydrogen chloride in the bed 22.

The gas in line 33 may be used as a subliming material and, if the chloride is hydrolyzable, it may be desirable to introduce steam in line 47 by opening valve 63 to cause the hydrolysis reaction to proceed.

The bed 24 may contain platinic chloride as the inorganic metal halide and this may suitably be decomposed by passing the hot flue gas introduced by line 45 or the hot make gas in line 33 into contact with the bed 24 which will decompose into free halogen, such as chlorine, and cause same to be formed and released in situ and contact the platinum supported on alumina catalyst. Heated inert gases from an extraneous source, such as nitrogen, may be used for this purpose. This modification not only releases and provides halogen in situ, but also adds platinum to the reforming catalyst and is doubly beneficial and useful.

After the bed 22 has been suitably regenerated and reactivated, it may suitably be placed back on the conversion stream and the bed 21 may then be regenerated and/or reactivated following the same sequence of operations.

It is to be understood that either of the beds may be regenerated by combustion operations and the reactivation treatment will be practiced only as required. As an example, the reactivation operation may be carried on after every 3 to 6 cycles of reforming operations and then reforming again for about 400 hours. In other words, the reactivation or restoration treatment may be conducted after reaction periods ranging from about 1200 to about 2400 hours.

Figure 2:
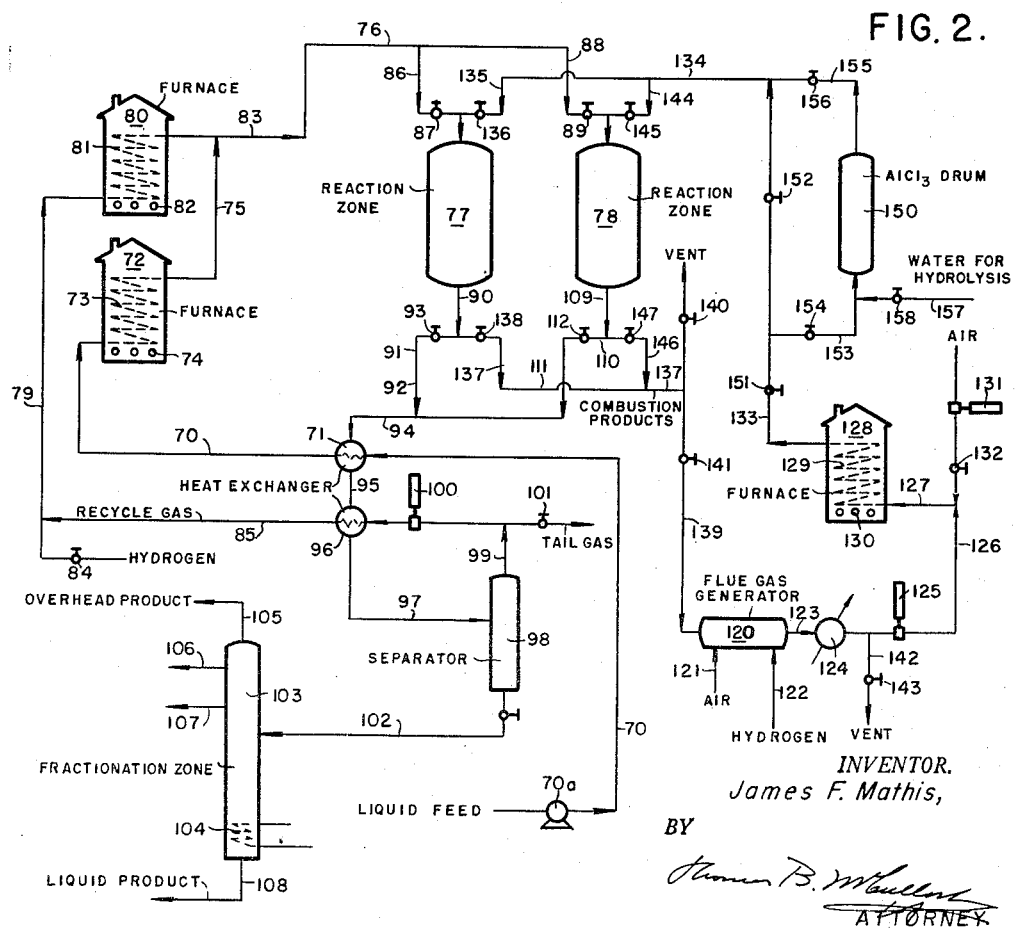
Fig. 2 is a flow diagram of a preferred mode.

Referring now to Fig. 2, a feed stock, such as has been described, is introduced into the system by line 70 containing pump 70a and is routed through a heat exchanger 71 and thence into a furnace 72 containing a heating coil 73 and provided with a heating means, such as gas burners 74. The heated feed discharges from furnace 72 by way of line 75 into a manifold arrangement 76 which connects into reaction zones 77 and 78 which contain beds of platinum on alumina catalyst. Reaction zones 77 and 78 suitably may be a plurality of reaction zones greater than the two shown. The feed stock may be admixed with a free hydrogen-containing gas introduced by line 79 into a furnace 80 containing a heating coil 81 and provided with heat from burners 82, the heated hydrogen-containing gas being discharged into manifold 76 by way of line 83 in admixture with the heated feed from line 75.

The free hydrogen-containing gas may be pure hydrogen introduced into line 79 which may be connected to a source of free hydrogen, not shown, by opening valve 84 or may be supplied all or in part by recycle gas introduced into line 79 by a line 85 from a source which will be described further hereinafter.

The reaction mixture of heated hydrocarbon feed may pass through line 86 of manifold 76 controlled by valve 87 into zone 77 or may discharge by line 88 controlled by valve 89 into reaction zone 78.

The products from the reaction zone 77 pass outwardly therefrom by way of line 90 into manifold 91 comprised of line 92 controlled by valve 93 into line 94 and in heat exchange with the feed by passage through heat exchanger 71 and thence by way of line 95 in heat exchange with the recycle gas in line 85 by passage through heat exchanger 96 and thence by line 97 into a separator 98 wherein a separation is made between the liquid and gaseous products. The gaseous products are separated in separator 98 and discharged by line 99 into line 85 following which the gas is compressed in compressor 100 and discharge through exchanger 96 and line 85 into line 79. A portion of the recycle gas in line 85 may be discharged as tail gas by opening valve 101.

The liquid products in separator 98 are discharged by line 102 into a fractionation zone 103 which may comprise a plurality of distillation towers but which for purposes of description is shown as a single fractionating tower provided with a heating means, such as steam coil 104, for adjustment of temperatures and pressures. An overhead light product is discharged from fractionation zone 103 by line 105 and side streams may be withdrawn by lines 106 and 107. Other liquid products may be withdrawn by line 108 as a bottoms fraction.

When the feed stock is routed to reaction zone 78, the products discharge therefrom through line 109 into manifold 110 comprised of line 111 and valve 112 which connects into line 94. Thereafter the flow is the same as with respect to the products from reaction zone 77.

It is customary to operate the reaction zones 77 and 78 with one or more of a plurality of reaction zones on the operating cycle and one or more of the reaction zones on the reactivation cycle. Assuming for the purpose of this description that the reaction zone 77 has been on the reaction cycle and activity of the catalyst therein has declined or deteriorated and it is desirable to reactivate same in accordance with the present invention; coke may have been laid down on the catalyst during the operation and it is desirable to remove same. Reaction zone 78 would be on the reaction cycle and reaction zone 77 would be removed from the reaction cycle by closing valves 87 and 93. It is desired to remove the coke by controlled oxidation and to accomplish this air and hydrocarbon may be burned in a flue gas generator 120 which is provided with lines 121 and 122 for introducing air and hydrocarbon thereto. The flue gas discharged from the generator 120 by line 123 and routed through a temperature adjusting means 124 and then through a compressor 125 and thence by lines 126 and 127 into a furnace 128 provided with a coil 129 and with heating means, such as burners 130. Air for supporting the combustion operation is introduced into line 126 and thence into a compressor 131 and through valve 132, in admixture with the flue gas, into line 127.

The heated mixture of flue gas and air then discharges by line 133 into line 134 and thence by way of line 135 and valve 136 in manifold 76 into reaction zone 77 wherein a combustion operation takes place for removal of the coke. The products of combustion issue from zone 77 into manifold 91 and particularly through line 137 and valve 138 thereof and thence into line 139. The combustion products may either be discharged from the system by opening valve 140 or may be routed through flue gas generator 120 by opening valve 141 and closing valve 140. Excess gas may be discharged from line 123 through branch line 142 by opening valve 143 therein once the operation has been started and a sufficient amount of flue gas is available.

When reaction zone 78 requires reactivation, the coke may be removed therefrom in a similar manner with the combustible supporting gas being introduced from line 134 into manifold 76 and into line 144 therein by opening valve 145, valve 89 being closed. Under these conditions, reaction zone 77 would be placed back on the reaction cycle.

The combustion products in reaction zone 78 discharge therefrom by line 146 controlled by valve 147 into line 137 and thence into line 139.

After the coke or carbonaceous bodies have been removed from either zone 77 or 78, it is desirable to introduce free halogen thereto to reactivate or activate the catalyst and this may suitably be done by providing a drum or vessel 150 containing an inorganic metal halide, such as aluminum chloride. By opening valve 151 in line 133 and closing valve 152 therein, all or part of the flue gas at a suitable elevated temperature may be routed by branch line 153 controlled by valve 154 through drum 150 and thence by line 155 controlled by valve 156 into line 134 for discharge either into reaction zone 77 or 78 as the case may be depending on which vessel is on the reaction cycle or the reactivation cycle. This causes the aluminum chloride to be sublimed and carried into the particular reaction zone 77 or 78 on the reactivation cycle. It may be desirable to introduce water in a vaporous form, such as steam, to vessel 150 by way of line 157 controlled by valve 158. This water will hydrolyze the aluminum chloride and form hydrogen chloride which will then pass by line 134 into vessel 77 or vessel 78 or the water in a vaporous or liquid form may be added separately to vessels 77 or 78 when or if the aluminum chloride is sublimed therein.

The conditions in zones 77 or 78 during the reaction cycle may range from about 800° to about 1000° F. with a feed liquid hourly space velocity of from about 0.1 to 10.0, with a recycle gas ratio from about 1.0 to about 10.0 mols per mole of feed and at a pressure from about 15 to about 400 pounds per square inch absolute.

Conditions in either zone 77 or zone 78 during the coke burning operation may range from about 700° to about 1100° F. with a flue gas having an oxygen content of 0.1 to 5.0 mol percent and at a pressure from about 15 to about 450 pounds per square inch absolute. The linear superficial gas velocity may range from about 0.1 to about 10 feet per second.

During operation, such as has been described with respect to the reaction cycle, chlorides are lost from the catalyst. These chlorides are replaced by using inorganic metal halide which is either sublimable, reducible, or decomposable by heat to form volatile halogens to replace the chlorides. For example, the vessel 150 may contain a reducible chloride, such as has been illustrated, or a sublimable or heat decomposable chloride or halide. In cases where sublimable chloride is employed, it may be necessary to hydrolyze same as has been described.

When the halide treatment is being employed, the gases in line 137 are not recycled but are vented through line 139 by opening valve 140 and closing valve 141.

It will be seen from the foregoing description that a method has been described for reactivating platinum reforming catalyst.

The platinum reforming catalyst employed in the practice of the present invention is suitably a platinum on alumina catalyst containing from about 0.1% to about 3.0% by weight of platinum, preferable from 0.2% to 1.0% by weight. The alumina on which the platinum is deposited is a purified alumina, such as gamma alumina derived from boehmite. Although gamma alumina or purified alumina is preferred, platinum on purified alumina derived from other sources may suitably be used. It is to be emphasized that the alumina should be free from silica and other undesirable impurities.

The nature of the improvement by way of which a treatment with solid inorganic metal halide to form and release in situ free halogen reactivates the catalyst is not entirely known. Without limiting the present invention to this explanation, it is postulated that free halogen is provided in the presence of the platinum catalyst supported on purified alumina to maintain in the reforming zone an amount of halogen in the range from about 30% to about 130%, preferably 75% to 90%, by weight of the platinum which causes beneficial products to be formed during the conversing operation. However, the invention is not to be limited by any explanation given by way of explaining the beneficial results.

While the invention is mainly concerned with the so-called reactivation of spent platinum reforming catalyst, it is to be understood that platinum reforming catalyst supported on purified alumina may suitably be activated by treatment in accordance with the present invention to provide an amount of halogen within the range given or to maintain the amount of halogen with the range given.

The nature and objects of the present invention having been completely described and illustrated, what I wish to claim as new and useful and to secure by Letters Patent is:

1. A method for reactivating a platinum reforming catalyst containing from about 0.1% to about 3.0% by weight of platinum which comprises treating a solid inorganic metal halide selected from the group consisting of aluminum chloride, platinic chloride, ferric chloride, ferrous chloride, cupric chloride, silver chloride, gold chloride, chromium chloride and nickel chloride at an elevated temperature in the range from about 352° to about 1000° F. under conditions to form and release voltile halogen, said metal halide and said platinum reforming catalyst being arranged in a reforming zone, and then contacting said platinum reforming catalyst in said reforming zone with said volatile halogen to maintain in said reforming zonue an amount of said halogen in the range from about 30% to about 130% by weight of the platinum, whereby said platinum reforming catalyst is reactivated for use in reforming hydrocarbons in said reforming zone.

2. A method in accordance with claim 1 in which the metal halide is AlCl$_3$ which is treated with a hydrolyzing medium.

3. A method in accordance with claim 1 in which the metal halide is PtCl$_2$ which is treated at a temperature no less than 680° F.

4. A method in accordance with claim 1 in which the halide is reducible.

5. A method in accordance with claim 1 in which the metal halide and the reforming catalyst are arranged in separate beds in the reforming zone with the bed of metal halide upstream from the bed of reforming catalyst.

6. A method in accordance with claim 1 in which the solid inorganic metal halide is thermally decomposable and is arranged as a bed upstream from the platinum reforming catalyst and the solid inorganic metal halide and the platinum reforming catalyst are heated by flowing a heated gas therethrough.

7. A method in accordance with claim 6 in which the heated gas is nitrogen.

8. A method in accordance with claim 6 in which the heated gas is hydrogen.

9. A method for reactivating a platinum reforming catalyst which comprises arranging a solid inorganic metal halide selected from the group consisting of aluminum chloride, platinic chloride, ferric chloride, ferrous chloride, cupric chloride, silver chloride, gold chloride, chromium chloride and nickel chloride in a reforming zone containing a platinum reforming catalyst supported on alumina containing from about 0.1% to about 3.0% by weight of platinum, then treating said solid inorganic metal halide at an elevated temperature in the range from about 352° to about 1000° F. under conditions to form and release in situ in said reforming zone volatile halogen in contact with said platinum reforming catalyst to maintain in said reforming zone an amount of said halogen in the range from about 30% to about 130% by weight of the platinum whereby said platinum reforming catalyst is reactivated, and thereafter contacting under reforming conditions in the presence of hydrogen, said reactivated catalyst with a hydrocarbon feed stock containing naphthenes and boiling in the gasoline range.

10. A method in accordance with claim 9 in which the inorganic metal halide is aluminum chloride and in which the treatment of inorganic metal halide includes sublimation followed by hydrolysis to form and release said volatile halogen.

11. A method in accordance with claim 9 in which the metal halide is cupric chloride and in which the treatment includes reduction of the inorganic metal halide at a temperature in the range from about 680° to about 1000° F.

12. A method in accordance with claim 9 in which the metal halide is silver chloride and in which the treatment includes reduction of the inorganic metal halide at a temperature in the range from about 680° to about 1000° F.

References Cited in the file of this patent

UNITED STATES PATENTS

| | | |
|---|---|---|
| 2,785,138 | Milliken | Mar. 12, 1957 |
| 2,828,200 | Nixon | Mar. 25, 1958 |
| 2,910,429 | Brennan et al. | Oct. 27, 1959 |